(12) United States Patent
Froehlich et al.

(10) Patent No.: US 10,610,876 B2
(45) Date of Patent: Apr. 7, 2020

(54) METHOD FOR OPERATING A SURFACE TREATMENT PLANT

(71) Applicant: Eisenmann SE, Boeblingen (DE)

(72) Inventors: Georg Froehlich, Oberderdingen (DE); Juergen Roeckle, Magstadt (DE)

(73) Assignee: EISENMANN SE, Böblingen (DE)

( * ) Notice: Subject to any disclaimer, the term of this patent is extended or adjusted under 35 U.S.C. 154(b) by 88 days.

(21) Appl. No.: 15/543,705

(22) PCT Filed: Jan. 9, 2016

(86) PCT No.: PCT/EP2016/000040
§ 371 (c)(1),
(2) Date: Jul. 14, 2017

(87) PCT Pub. No.: WO2016/113129
PCT Pub. Date: Jul. 21, 2016

(65) Prior Publication Data
US 2017/0368566 A1    Dec. 28, 2017

(30) Foreign Application Priority Data

Jan. 16, 2015   (DE) .................. 10 2015 000 585

(51) Int. Cl.
*B01D 46/00* (2006.01)
*B01D 46/10* (2006.01)
(Continued)

(52) U.S. Cl.
CPC ............ *B05B 14/437* (2018.02); *B01D 46/10* (2013.01); *B01D 2273/12* (2013.01)

(58) Field of Classification Search
CPC ............... B01D 46/00; B01D 46/0002; B01D 46/0041; B01D 2273/12; B01D 46/10;
(Continued)

(56) References Cited

U.S. PATENT DOCUMENTS 3,944,404 A  *  3/1976  Andrasfalvy ......... B05B 14/435
                                                                 55/294
5,743,958 A     4/1998  Shutic
(Continued)

FOREIGN PATENT DOCUMENTS

CN      102224012      10/2011
CN      103608124       2/2014
(Continued)

*Primary Examiner* — Minh Chau T Pham
(74) *Attorney, Agent, or Firm* — Schroeder Intellectual Property Law Group, LLC

(57) ABSTRACT

A method for operating a surface treatment plant, resulting overspray in a coating booth is taken up by an air flow. The air flow loaded with overspray is conveyed as exhaust air flow to at least one separation unit in which overspray is separated out. In a supply region upstream of the at least one separation unit and/or in an internal space of the at least one separation unit, a filter aid having a separation aggregate state is added to the exhaust air flow and forms, with the overspray, a separation mixture which is separated in or at the at least one separation unit. The filter aid used is solid or liquid in the separation aggregate state. In the at least one separation unit, conditions are established in which the filter aid transitions from the separation aggregate state into a gaseous aggregate state such that the gaseous filter air can separate from the separation mixture.

7 Claims, 2 Drawing Sheets

(51) Int. Cl.
*B05B 15/12* (2006.01)
*B05B 14/43* (2018.01)

(58) Field of Classification Search
CPC . B05B 15/1248; B05B 15/1255; B05B 15/12; B05B 15/1225; B05B 14/437
USPC ...... 55/385.2, 422, 482, 524, 308, 318, 339, 55/DIG. 46; 95/267, 280, 285, 287, 23, 95/108; 96/372, 373, 150, 156, 157, 174, 96/134; 118/309, 326, 610, 712, 300; 423/210; 427/8, 300, 401, 426; 454/10, 454/50, 53, 54, 55
See application file for complete search history.

(56) References Cited

U.S. PATENT DOCUMENTS

| | | | |
|---|---|---|---|
| 6,071,558 A | 6/2000 | Shutic | |
| 6,361,605 B1 | 3/2002 | Shutic et al. | |
| 6,679,193 B2 | 1/2004 | Shutic et al. | |
| 8,241,406 B2* | 8/2012 | Weschke | B01D 46/0068 95/278 |
| 8,535,420 B2 | 9/2013 | Holler et al. | |
| 9,321,070 B2 | 4/2016 | Link et al. | |
| 9,333,521 B2* | 5/2016 | Holler | B01D 46/0057 |
| 9,517,427 B2* | 12/2016 | Herding | B01D 46/0041 |
| 9,643,118 B2 | 5/2017 | Wieland et al. | |
| 10,150,304 B2 | 12/2018 | Herre et al. | |
| 2002/0096111 A1 | 7/2002 | Shutic et al. | |
| 2009/0209188 A1 | 8/2009 | Wieland et al. | |
| 2011/0041691 A1* | 2/2011 | Weschke | B01D 46/0068 95/278 |
| 2011/0262622 A1 | 10/2011 | Herre et al. | |
| 2014/0202332 A1 | 7/2014 | Link et al. | |
| 2014/0366798 A1 | 12/2014 | Katefidis et al. | |
| 2015/0135955 A1 | 5/2015 | Link et al. | |
| 2017/0209891 A1 | 7/2017 | Wieland et al. | |
| 2018/0250955 A1 | 9/2018 | Herre et al. | |
| 2019/0193421 A1 | 6/2019 | Herre et al. | |

FOREIGN PATENT DOCUMENTS

| | | |
|---|---|---|
| DE | 42 11 465 A1 | 10/1993 |
| DE | 44 31 272 A1 | 3/1996 |
| DE | 10 2005 013 708 A1 | 9/2006 |
| DE | 20 2010 012 437 U1 | 12/2010 |
| DE | 10 2011 117 667 A1 | 5/2013 |
| DE | 10 2012 004 704 A1 | 9/2013 |
| DE | 20 2013 006 713 U1 | 11/2013 |
| DE | 20 2014 001 981 U1 | 5/2014 |
| EP | 1 704 926 A2 | 9/2006 |
| JP | 2013-226559 | 11/2013 |
| WO | 96/11066 | 4/1996 |
| WO | 2011/076600 A1 | 6/2011 |

* cited by examiner

METHOD FOR OPERATING A SURFACE TREATMENT PLANT

RELATED APPLICATIONS

This application is a national phase of International Patent Application No. PCT/EP2016/000040, filed Jan. 9, 2016, which claims the filing benefit of German Patent Application No. 10 2015 000 585.5, filed Jan. 16, 2015, the contents of both of which are incorporated herein by reference.

FIELD OF THE INVENTION

The invention relates to a method for operating a surface treatment plant, in which
a) overspray, which occurs in a coating booth, is absorbed by an airflow;
b) the overspray-laden airflow is conducted as exhaust airflow to at least one separation unit in which overspray is separated out;
c) a filtration aid material, which features a separation aggregate state, is fed to the exhaust airflow in a feed region upstream of the at least one separation unit and/or in an interior of the at least one separation unit, which filtration aid material forms with the overspray a separation mixture which is separated out in or on the at least one separation unit.

BACKGROUND OF THE INVENTION

During the manual or automatic application of lacquers to objects, a partial flow of the lacquer, which generally contains both solids and/or binding agents and solvents, is not applied to the object. In professional circles, this partial flow is called "overspray". Furthermore, the terms overspray or overspray particles are always understood in the sense of a disperse system, such as an emulsion or suspension or a combination thereof. The overspray is gathered by the airflow in the spray booth and fed to a separator so that the air, possibly after a suitable conditioning, can be directed back into the coating booth again.

Particularly in plants with greater lacquer consumption, for example in plants for lacquering vehicle bodies, wet separation systems are preferably used in a known manner on the one hand or electrostatically operating dry separators are used on the other hand.

As alternatives to current, stationary wet and dry separation systems, which can also operate electrostatically, systems with exchangeable disposable separation units are also used, which systems after reaching a limit loading with overspray are exchanged for unladen separation units and disposed of or possibly recycled. The preparation and/or disposal of such separation units can be energetically more acceptable, and also more acceptable with regard to the required resources, than the cost in the case of a wet separator or an electrostatically operating separating device.

Overspray as a rule has strongly adhering properties and in most cases has liquid constituents, which makes the deposition and separation of the overspray from the exhaust air more difficult. For this reason, a filtration aid material, which facilitates a separation of the overspray, is fed to the overspray-laden exhaust air. The overspray particles are as a rule comparatively small and have a low mass. This additionally makes the separation more difficult.

For this, there are various known approaches. In this respect, DE 20 2014 001 981 U1, for example, describes ice being fed as filtration aid material. The overspray particles are bonded to the now, however, frozen liquid, like in the case of wet separation, as a result of which the mass and the volume of the particles present in the airflow are increased and their separation in for example a cyclone or other filter is made easier. After separation, liquid water, which has to be separated in a comparatively costly manner from the overspray, exists again.

A dry separation system, in which filtration aid material in the form of rock meal is fed to the overspray-laden exhaust air, is known from DE 10 2005 013 708 A1. This is deposited as a barrier layer on the filter surface and thereby prevents adhesion and blocking of the filter in use. The rock meal subsequently has to be separated as such from the overspray or disposed of partially still wetted with overspray, which can be problematic especially from the environmental engineering point of view.

A further dry separation system is known from DE 10 2011 117 667 A1. Separation units, which are designed as above-mentioned disposable separation units and after reaching a limit loading with overspray are exchanged as a laden disposable separation unit for an empty disposable separation unit, are provided there. An effective separation is also desirable here, however. Nevertheless, a filtration aid material in this case would to a considerable extent contribute to the limit loading of the disposable separation units, as a result of which the overall absorption of overspray per disposable separation unit would be reduced.

SUMMARY OF THE INVENTION

It is therefore an object of the invention to provide a method of the type referred to in the introduction which reduces these disadvantages.

This method may be achieved in a method of the type referred to in the introduction by
d) use being made of a filtration aid material which is solid or liquid in the separation aggregate state;
e) conditions being created in the at least one separation unit in which the filtration aid material changes from the separation aggregate state into a gaseous aggregate state so that the gaseous filtration aid material can be separated from the separation mixture.

In this way, the gaseous filtration aid material, after the separation process, can be absorbed by the following air and removed from the separation unit, wherein it can then be separated from the airflow separately at another point. The separated overspray remains in the separation unit.

The method can be used particularly effectively if the at least one separation unit is designed as a disposable separation unit and after reaching a limit loading is exchanged as a laden disposable separation unit for an empty disposable separation unit. With this concept, the filtration aid material does not then contribute, or contributes only to a small degree, to the limit loading of the disposable separation unit so that the absorption capacity which is made available by a separation unit can be fully or at least largely used for overspray although a filtration aid material is used.

For an effective introduction of the filtration aid material into the airflow, it is favorable if use is made of a filtration aid material which can be atomized or nebulized.

In the case of a solid filtration aid material, a powder material is preferably used as filtration aid material.

As filtration aid material, use is preferably made of a material which comprises one or more of the following materials: liquefiable gases, especially carbon dioxide, nitrogen, air, oxygen, hydrogen, natural gases and also hydrocarbons; compounds which during normal conditions have an increased saturated water vapor pressure of over 10 hPa, preferably over 100 hPa, especially alcohols, propellants or refrigerants; compounds which at temperatures of up to 150° C. have a saturated water vapor pressure of over 10 hPa, preferably over 100 hPa, especially water or glycols.

It may be favorable if a material which can be statically charged is used as filtration aid material.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

An exemplary embodiment of the invention is now explained in more detail below with reference to drawings. In these drawings.

DETAILED DESCRIPTION OF THE PRESENT INVENTION

Figure 1:
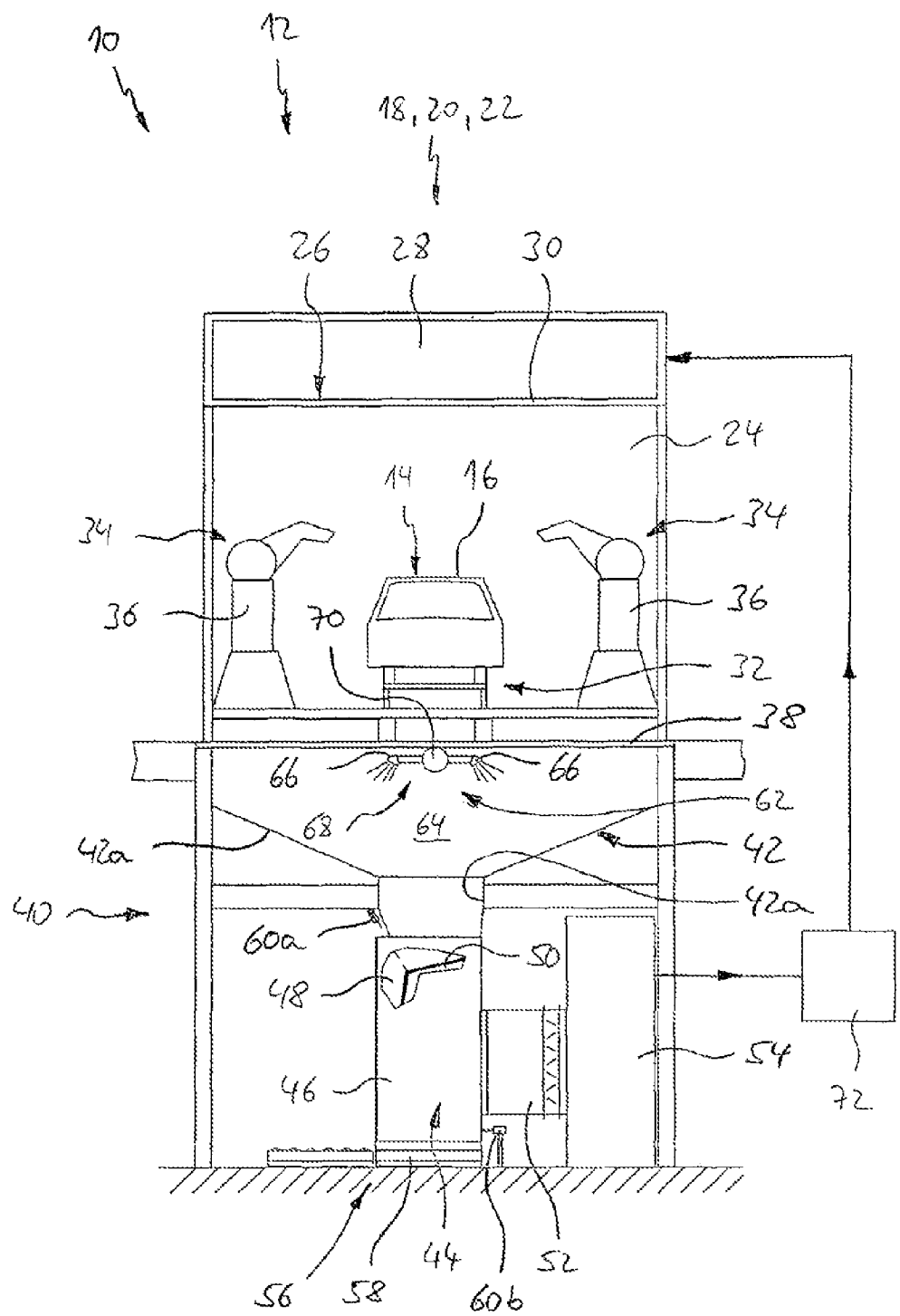
FIG. 1 shows in a front view a spray booth with a separation device for overspray, in which a filtration aid material is fed with the aid of a filtration aid device to the overspray-laden exhaust air on its flow path toward separation units.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

In FIG. 1, a coating booth of a surface treatment plant 12, in which objects 14 are lacquered, is designated 10 overall. Vehicle bodies 16 are shown as an example of objects 14 to be lacquered. Before these reach such a coating booth 10, they would for example be cleaned and degreased in pre-treatment stations, which are not shown separately.

After this, the vehicle bodies 16 in successive coating stations 18, 20 and 22 are provided with a primer, a base coat of lacquer and a top coat of lacquer, as is known per se; the various coating stations 18, 20, 22 are only illustrated by the designations in FIG. 1. Arranged in each of these coating stations 18, 20, 22 is a coating booth 10 in which the respective coating material is applied to the vehicle body 16.

In each coating booth 10 of the various coating stations 18, 20, 22 different types of overspray occur, i.e. generally speaking, the surface treatment plant 12 comprises a plurality of coating booths 10 in which different types of overspray occur.

The coating booth 10 has a coating tunnel 24, arranged at the top, with a cover 26 which is customarily designed with a filter cover 30 as the lower limit of an air feed chamber 28.

The vehicle bodies 16, by means of a conveyor system 32 which is accommodated in the coating tunnel 24 and known per se, are transported from the entry side of the coating tunnel 24 to its exit side. Located inside the coating tunnel 24 are application devices 34 in the form of multi-axis application robots 36, as are also known per se. By means of the application robots 36, the vehicle bodies 16 can be coated with the corresponding coating material.

Toward the bottom, the coating tunnel 24 is open via an accessible grid 38 to a plant region 40, disposed thereunder, in which overspray particles which are carried along by the exhaust air are separated from said exhaust air.

During the coating process, air flows from the air feed chamber 28 downward through the coating tunnel 24 to the plant region 40, wherein the air absorbs and carries along lacquer overspray which is present in the coating tunnel 24.

This exhaust air, now laden with overspray, is directed with the aid of an air guiding device 42 to a plurality of separation units 44 which in the present exemplary embodiment are designed as disposable separation units and exist in the form of disposable filter modules 46. These are arranged in series in the longitudinal direction of the coating booth 10, which is why only one such disposable filter module 46 is to be seen in FIG. 1. Further reference is made to filter modules 46 below; however, separation units 44 which are not designed as a disposable system can also be used. For this purpose, for example electrostatically operating separation units, as are known per se, are a possibility.

Each filter module 46 can be designed in an as known per se manner for example as a separation filter or as an inertia filter or even as a combination thereof.

The air guiding device 42 comprises air deflector plates 42a which at least partially delimit the flow path of the exhaust air and guide this to the filter modules 46. During operation, each filter module 46 is fluidically and detachably connected to the air guiding device 42. The exhaust air flows in the filter module 46 through an interior space 48 and a filter unit 50 which is accommodated there and on which the lacquer overspray is deposited. Overall, each disposable filter module 46 is designed as an exchangeable modular unit.

The air, largely freed of overspray particles, then flows out of the filter module 46 into an intermediate channel 52 via which it makes its way into a collecting flow passage 54. The air is fed via the collecting flow passage 54 to a further treatment and conditioning facility and after this is directed in a cyclic manner into the air feed chamber 28 again from which it flows from the top in the coating tunnel 24 again.

If the exhaust air is not yet sufficiently freed of overspray particles by means of the existing filter modules 46, additional filter stages can be mounted downstream to the filter modules 46 and to which the exhaust air is fed and in which for example non-woven fabric filters or also the aforementioned electrostatically operating separation filters are used. If necessary, one or more such additional filter stages can also be integrated into the filter module 46.

The filter module 46 is locked in its operating position by means of a locking device, which is not shown separately. In the case of the present exemplary embodiment, the filter module 46 can be fluidically connected to the air guiding device 42 or can be detached from this by it being moved in the horizontal direction.

In general, the connecting and disconnecting movements depend, however, on the clearance of the components and can also have vertical movement components.

Each filter module 46 is designed for accommodating a maximum amount of material, i.e. for a limit loading with material, which depends on the type of construction of the filter module and the materials used for this and also on the type of overspray which occurs. The amount of material which is already accommodated can be monitored via a measuring device 56. In FIG. 1, scales 58 on the one hand and sensors 60a and 60b on the other hand are shown as supplementary or alternative components of such a measuring device 56.

With the aid of the scales 58, the loading of the filter module 46 is determined based on its weight. In the case of the sensor 60*a*, it can for example be a layer-thickness sensor by means of which the thickness of the material layer, which builds up on the filter unit 50 and occurs during the depositing of the overspray, can be detected. From the thickness of this layer, conclusions can be drawn in turn about the amount of loading of the filter module 46. The sensor 60*b* can for example be a sensor for moisture, temperature or pressure. Particularly in the latter case, the presence of the limit loading can be detected by means of a differential pressure determination. The greater the loading of the filter module 46, the greater is the air resistance which is built up by the filter module 46.

When a filter module 46 reaches its maximum holding capacity, the locking device is released and the fully laden filter module 46 is withdrawn from the lower plant region 40 of the coating booth 10.

Overall, the exchange of one or more disposable filter modules 46 can be carried out fully automatically or at least semi-automatically. Alternatively, such an exchange can also be carried out for example with the aid of a pallet truck, not shown separately, which is operated by a worker. To this end, the bottom region of the filter module 46 can be designed in its geometry and its dimensions as a standardized carrying structure and for example according to the specification of a so-called Euro-pallet.

The flow connection of the filter module 46 which is to be exchanged to the air guiding device 42 is closed off in advance by means of a shut-off slide, which is not shown separately. After the full filter module 46 has been withdrawn, an empty filter module 46 is pushed into the operating position in which this is connected in a flow-tight manner to the air guiding device 42, after which the locking device is again locked. The shut-off slide of the air guiding device 42 is brought into an open position again so that the newly positioned filter module 46 is exposed to a through-flow of exhaust air.

The disposable filter module 46 can be produced overall, including its filter unit 50, from a water-resistant recycled material. Generally speaking, one component, a plurality of components or all the components of the filter module 46 can be produced from a water-resistant recycled material. For this purpose, for example cellulose materials such as possibly treated paper and cardboard materials, corrugated cardboard, cardboards with vertical corrugations, cardboards with honeycomb structure or cardboard rolls, but also other materials, such as MDF materials, are a possibility. The bottom region of the filter module 46 can also be formed separately by means of a Euro-pallet made of wood. Plastics such as in particular polyethylene or polypropylene are also a possibility.

In order to now improve the separation of overspray in the filter modules 46, the coating booth 10 comprises a filtration aid device 62 by means of which a filtration aid material can be fed to the exhaust air flow in a feed region 64 upstream of the separation units 44 or of the disposable filter modules 46 of the disposable filter modules 46, which filtration aid material has a separation aggregate state during the feeding. Alternatively or additionally, the filtration aid material can also be fed to the interior space 48 of the separation units 44.

In the case of the feed region 64 upstream of the separation units 44 in the present exemplary embodiment it is the region of the flow path of the exhaust air between the coating tunnel 24 and the separation units 44. If necessary, the filtration aid material can also be fed, however, to the exhaust air in the coating tunnel 24, for example in a region beneath the vehicle bodies 16.

Use is made of a filtration aid material which is solid or liquid in the separation aggregate state and in this separation aggregate state forms with overspray a separation mixture which is deposited in or on the separation units 44. The filtration aid material has the property that it can change to a gaseous form at the latest after depositing its aggregate state. A solid filter material can possibly sublimate without changing into a liquid phase.

In the separation units 44, conditions now prevail, or conditions are now created, in which the filtration aid material changes from the separation aggregate state into a gaseous aggregate state so that the gaseous filtration aid material can be separated from the separation mixture. These conditions can exist either continuously during the entire separation process or be created, or exist, in periodic intervals. Therefore, the phase change of the filtration aid material can be enabled by influencing the thermodynamic equilibrium for example by increasing the ambient temperature and/or by reducing the ambient pressure. The separation units 44 can for example be correspondingly temperature controlled.

In addition to a temperature increase, a quicker transporting away of already gaseous filtration aid material by increasing the flow velocity of the air in the region of separation can also contribute to acceleration of this phase change. A large effective surface on account of a small particle size or droplet size of the filtration aid material is also helpful. This for example can be carried out mechanically by stirring the filtration aid material in a collecting vessel. The separation of the filtration aid material can also be carried out by carrier vapor distillation, especially water vapor distillation, in which by introduction of carrier gas or carrier vapor and its entraining effect the phase change is promoted.

As result of this, the now gaseous filtration aid material can be absorbed and carried along by the following air and in this way can be removed from the separation units 44 so that only overspray remains behind there at least in the main. The airflow therefore releases the separation mixture consisting of overspray and filtration aid material in the separation unit 44 on the one hand and on the other hand absorbs the gaseous filtration aid material.

The filtration aid material therefore does not contribute, or contributes only in small part, to the loading of the separation units 44 and specifically to the limit loading of the filter modules 46 so that the amount of separated overspray per operating cycle of a separation unit 44 is higher than in the case in which the filtration aid material remains in the respective separation unit 44.

In the exemplary embodiment shown in FIG. 1, the filtration aid device 62 comprises a plurality of dispensing elements in the form of nozzles 66 which, arranged just beneath the grid 38, are arranged in series in the longitudinal direction of the coating booth 10.

Two nozzles 66 are always arranged as a nozzle pair 68 so that filtration aid material is dispensed into the feed region 64 from the middle toward both sides. By means of the nozzles 66, a filtration aid material, which can be atomized or nebulized, can be dispensed into the feed region 64.

The injecting of the filtration aid material can be carried out in direct flow, in counterflow, in crossflow or in combinations thereof with regard to the exhaust air flow. Use can also be made of movable nozzles 66 in which there is a rotating axial movement or an oscillating linear movement. As a result of this, the number of nozzles 66, with steady covering of the flow cross-sectional area of the feed region 64, can be reduced. In this case, a single nozzle 66 instead of a nozzle pair 68 possibly suffices. A nozzle 66 can for example also be positioned directly upstream of the separation unit 44 in the flow direction.

Figure 2:
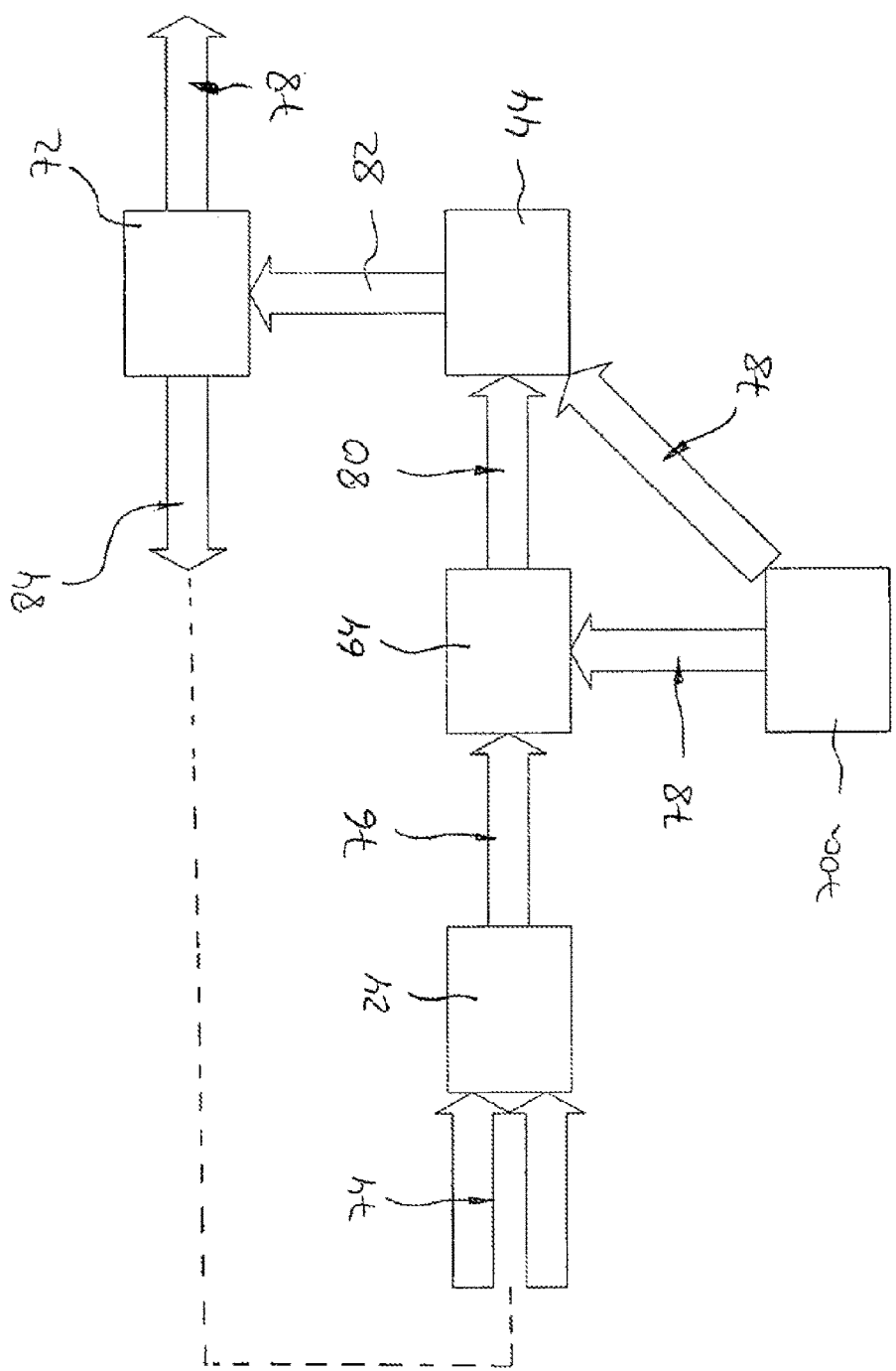
FIG. 2 again shows in a schematic arrangement the flow course of booth air.

The nozzles 66 are supplied with filtration aid material via a supply pipe 70 which in its turn is fed from a filtration aid material source which in FIG. 2 is designated 70*a*. Delivery components such as pumps, pipes and control devices or the like for the filtration aid material are not shown separately for the sake of clarity.

The filtration aid material is introduced in the flow direction of the exhaust air. In one variant, the nozzles 66 can also be arranged on both sides of the air guiding device 42 so that the filtration aid material is introduced into the feed region 64 from the bottom in the direction opposite the overspray-laden exhaust air. In a further variant, filtration aid material can also be introduced directly into the separation units 44; this is illustrated in FIG. 2 by means of a corresponding flow arrow from the filtration aid material source 70*a* to the separation unit 44.

The nozzles 66 and possibly diffusers, as are known per se, can be operated with or without carrier gas support and be designed as jet pumps, a Venturi tube or the like. Instead of the nozzles 66, the filtration aid device 62 can also comprise one or more rotary atomizers, electrostatic atomizer or ultrasonic nebulizers, as are known per se.

The overspray-laden exhaust air absorbs the filtration aid material which is introduced into the feed region 64. This can possibly also unstick the overspray and/or absorb or bind liquid constituents of the overspray, as a result of which a gumming up of the filter modules 46 can be prevented.

The air, which has been freed of overspray in the separation units 44 and now carries along filtration aid material which has been changed into the gaseous aggregate state, makes its way from the collecting flow passage 54 into a separating device 72 in which the gaseous filtration aid material is removed from the air. From there, the air, now also freed of filtration aid material, then makes its way again in a cyclic manner into the air feed chamber 28, as explained above.

Again in a schematic arrangement, FIG. 2 illustrates the flow path of the air and the individual cleaning steps, wherein the respectively differently composed flows are illustrated by means of arrows and also bear designations:

First of all, conditioned air 74 flows out of the air feed chamber 28 into the coating tunnel 24 and absorbs overspray there. This overspray-laden booth air leaves the coating tunnel 24 as exhaust air 76 which makes its way into the feed region 64. There, the filtration aid material—the arrows associated with FIG. 2 bear the designation 78—is blown into the exhaust air 76, as a result of which separated exhaust air 80 is created and then flows into the separation units 44.

A mixture consisting of overspray and filtration aid material is first of all deposited there. On account of the operating conditions in the separation units 44 the filtration aid material changes into the gaseous aggregate state there and is absorbed by following air so that an aid-material exhaust air 82, laden only with filtration aid material, flows out of the separation units 44.

The aid-material exhaust air 82 now makes its way into the separating device 72 where separated filtration aid material and purified exhaust air 84 is created and after possibly further conditioning steps is fed back as air 74 to the coating tunnel 24.

As filtration aid material, for example the following materials come into consideration: liquefiable gases, especially carbon dioxide, nitrogen, air, oxygen, hydrogen, natural gases and also hydrocarbons; compounds which under normal conditions have an increased saturated water vapor pressure of over 10 hPa, preferably over 100 hPa, especially alcohols, propellants or refrigerants; compounds which at temperatures of up to 150° C. have a saturated water vapor pressure of over 10 hPa, preferably over 100 hPa, especially water or glycols.

In the selection of the suitable filtration aid material, the type of overspray which is created has to be taken into consideration. The overspray particles need to agglomerate on the filtration aid material. This for example is promoted by the filtration aid material being blown in at a speed which lies below, especially considerably below, the speed of the flowing exhaust air.

As a result of this, during the blowing in of the filtration aid material turbulences are created in the flowing exhaust air, which turbulences promote an agglomeration of the overspray particles on the filtration aid material and can also lead to overspray particles coalescing. The number of individual overspray particles carried along by the exhaust air is reduced by coalescence due to the fact that the mass and the volume of the overspray particles are increased.

If the overspray particles agglomerate on the filtration aid material, the ensuing overspray/filtration aid material agglomerate has properties which are determined by the filtration aid material. Therefore, the filtration aid material can lead to the overspray particles freezing, as a result of which their adhesiveness is reduced. On the flow path of the exhaust air, less overspray is then deposited on the walls. If a large number of overspray particles accumulate on particles or droplets of the filtration aid material, an overspray shell, so to speak, is created. If the filtration aid material becomes gaseous after the depositing of the agglomerate, this overspray shell remains behind in the separation unit 44, having a comparatively large volume with low mass. As a result of the large volume, the deposition of the overspray on a filter can, however, be carried out effectively.

If the filtration aid material carries a loading which is opposite to a loading which possibly exists in the overspray this promotes the agglomeration of the overspray on the filtration aid material. A coalescence of the overspray particles can, however, take place more effectively if the filtration aid material and the overspray have equal loading. If on account of the blowing in of the filtration aid material a temperature gradient is created in the blowing-in region, this can also improve the agglomeration.

Depending on the conditions which prevail on the flow path between the feed region 64 and the separation units 44, at least some of the blown-in filtration aid material can even already change into the gaseous state before reaching the separation units 44. The filtration aid material and the course of the procedure can also be matched to each other in one variant so that the filtration aid material changes completely, or at least in the main completely, into the gaseous aggregate state before reaching the separation units 44. The filtration aid material can also comprise two or more material types, of which one reaches the separation units 44 in the form of a separation mixture consisting of filtration aid material and overspray, whereas another already changes into the gaseous aggregate state before reaching the separation units.

Such a filtration aid material supports the coalescing of the overspray particles, forming larger particles. For example, during the transition of the filtration aid material into the gaseous aggregate state turbulences can be built up and support the coalescing. The larger particles which are then formed then make their way, by means of their larger mass and their larger volume, without filtration aid material into the separation units where they are separated out more effectively, however, in comparison to smaller particles.

Properties of the filtration aid material can be utilized in the separating device 74 during the further process in order to remove the filtration aid material from the exhaust air. Therefore, the filtration aid material can have magnetic properties so that it can be removed from the exhaust air by means of a magnetic separating device 74. In the case of filtration aid materials with a static surface loading or even a loading which is simple to induce, the separating device 74 can for example operate electrostatically. If the filtration aid material has a correspondingly large dead weight, the separating device 74 can be designed as an inertia separator. If use is made of a filtration aid material the particles or droplets of which have a sufficiently large volume, the separating device 74 can also operate as a simple flow filter.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

We claim:

1. A method for operating a surface treatment plant comprising the steps of:
    a) absorbing overspray, which occurs in a coating booth, in an airflow;
    b) conducting the overspray-laden airflow as exhaust airflow to at least one separation unit in which the overspray is separated out;
    c) feeding a filtration aid material, which features a separation aggregate state, to the exhaust airflow in a feed region upstream of the at least one separation unit and/or in an interior of the at least one separation unit, which filtration aid material forms with the overspray a separation mixture which is deposited in or on the at least one separation unit, wherein
    d) the filtration aid material is solid or liquid in the separation aggregate state; and
    e) conditions are created in the at least one separation unit in which the filtration aid material undergoes a phase change and changes from the separation aggregate state into a gaseous aggregate state so that the gaseous filtration aid material can be separated from the separation mixture and reduce the amount of filtration aid material deposited on the at least one separation unit.

2. The method as claimed in claim 1, wherein the at least one separation unit is designed as a disposable separation unit and after reaching a limit loading is exchanged as a laden disposable separation unit for an empty disposable separation unit.

3. The method as claimed in claim 1, wherein use is made of a filtration aid material which can be atomized or nebulized.

4. The method as claimed in claim 1, wherein a powder material is used as filtration aid material.

5. The method as claimed in claim 1, wherein the filtration aid material comprises one or more of the following materials: liquefiable gases, especially carbon dioxide, nitrogen, air, oxygen, hydrogen, natural gases and also hydrocarbons; compounds which during normal conditions have an increased saturated water vapor pressure of over 10 hPa, especially alcohols, propellants or refrigerants; compounds which at temperatures of up to 150° C. have a saturated water vapor pressure of over 10 hPa, especially water or glycols.

6. The method as claimed in claim 1, wherein a material which can be statically charged is used as filtration aid material.

7. The method as claimed in claim 5, wherein the compounds during normal conditions have an increased saturated water vapor pressure over 100 hPa; and the compounds which at temperatures of up to 150° C. have a saturated water vapor pressure over 100 hPa.

* * * * *